US012218448B2

(12) United States Patent
Miyamura et al.

(10) Patent No.: US 12,218,448 B2
(45) Date of Patent: Feb. 4, 2025

(54) BOARD CONNECTING CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Daisuke Saito, Mie (JP); Yutaka Kobayashi, Mie (JP); Masanori Moriyasu, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 337 days.

(21) Appl. No.: 17/780,871

(22) PCT Filed: Nov. 11, 2020

(86) PCT No.: PCT/JP2020/041993
§ 371 (c)(1),
(2) Date: May 27, 2022

(87) PCT Pub. No.: WO2021/111827
PCT Pub. Date: Jun. 10, 2021

(65) Prior Publication Data

US 2023/0006382 A1 Jan. 5, 2023

(30) Foreign Application Priority Data

Dec. 2, 2019 (JP) ................................ 2019-217846

(51) Int. Cl.
*H01R 12/71* (2011.01)
*H01R 12/72* (2011.01)
(Continued)

(52) U.S. Cl.
CPC ........... *H01R 12/721* (2013.01); *H01R 13/11* (2013.01); *H01R 13/5202* (2013.01)

(58) Field of Classification Search
CPC .... H01R 12/721; H01R 12/72; H01R 12/722; H01R 13/11; H01R 13/10; H01R 13/02; H01R 13/5202; H01R 13/52
(Continued)

(56) References Cited

U.S. PATENT DOCUMENTS 2,858,515 A * 10/1958 Thunander ............. H01R 13/26 439/930
4,357,066 A * 11/1982 Cairns ................. H01R 12/721 439/862

(Continued)

FOREIGN PATENT DOCUMENTS

CN 202362816 U 8/2012
JP H11-162582 A 6/1999

(Continued)

*Primary Examiner* — Harshad C Patel
(74) *Attorney, Agent, or Firm* — Venjuris, P.C.

(57) ABSTRACT

A connector is provided with a connecting member including a contact point portion, a housing for holding the connecting member and a protecting member displaceable with respect to the connecting member to a protection position for protecting the contact point portion and a connection position for bringing the contact point portion into contact with a circuit board. The housing includes a lock portion for holding the protecting member at the protection position.

4 Claims, 9 Drawing Sheets

(51) Int. Cl.
*H01R 13/11* (2006.01)
*H01R 13/52* (2006.01)

(58) Field of Classification Search
USPC .......................................................... 439/634
See application file for complete search history.

(56) References Cited

U.S. PATENT DOCUMENTS

| | | | | | |
|---|---|---|---|---|---|
| 5,238,411 | A * | 8/1993 | Jinno | H01R 13/4223 439/59 |
| 5,775,950 | A * | 7/1998 | Tsuji | H01R 12/721 439/852 |
| 8,876,561 | B2 * | 11/2014 | Endo | H01R 12/721 439/752 |
| 9,065,198 | B2 * | 6/2015 | Uchida | H01R 13/5219 |
| 9,325,093 | B2 * | 4/2016 | Endo | H01R 12/87 |
| 9,413,090 | B2 * | 8/2016 | Nagamine | H01R 13/4223 |
| 9,831,578 | B2 * | 11/2017 | Mizuguchi | H01R 13/4361 |
| 11,848,519 | B2 * | 12/2023 | Miyamura | H01R 13/6335 |
| 2011/0021080 | A1 * | 1/2011 | Kamiya | H01R 12/778 29/874 |
| 2017/0117647 | A1 | 4/2017 | Mizuguchi | |

FOREIGN PATENT DOCUMENTS

| | | | |
|---|---|---|---|
| JP | 2001-135400 | A | 5/2001 |
| JP | 2015-090786 | A | 5/2015 |
| JP | 2017-103160 | A | 6/2017 |
| JP | 2019-079667 | A | 5/2019 |

* cited by examiner

BOARD CONNECTING CONNECTOR

CROSS REFERENCE TO RELATED APPLICATIONS

This application is a national phase of PCT application No. PCT/JP2020/041993, filed on 11 Nov. 2020, which claims priority from Japanese patent application No. 2019-217846, filed on 2 Dec. 2019, all of which are incorporated herein by reference.

TECHNICAL FIELD

The present disclosure relates to a connector.

BACKGROUND

A connector described in Patent Document 1 includes a board accommodating member for accommodating a circuit board and a terminal accommodating member for accommodating terminals. When the board accommodating member and the terminal accommodating member are fit, the circuit board is inserted into a board insertion portion of the terminal accommodating member and contact portions of the terminals are connected to the circuit board. A connector provided with terminals to be connected to a circuit board is also disclosed in Patent Document 2.

PRIOR ART DOCUMENT

Patent Document

Patent Document 1: JP 2017-084570 A
Patent Document 2: JP 2015-090786 A

SUMMARY OF THE INVENTION

Problems to be Solved

In the case of Patent Document 1, the contact portions of the terminals are exposed in the board insertion portion before being connected to the circuit board. Thus, an external matter from outside may interfere with the contact portions of the terminals and damage the contact portions.

Accordingly, the present disclosure aims to provide a connector capable of ensuring connection reliability with a circuit board.

Means to Solve the Problem

The present disclosure is directed to a connector with a connecting member including a contact point portion, a housing for holding the connecting member, and a protecting member displaceable with respect to the connecting member to a protection position for protecting the contact point portion and a connection position for bringing the contact point portion into contact with a circuit board, the housing including a lock portion for holding the protecting member at the protection position.

Effect of the Invention

According to the present disclosure, it is possible to provide a connector capable of ensuring connection reliability with a circuit board.

DETAILED DESCRIPTION TO EXECUTE THE INVENTION

Description of Embodiments of Present Disclosure

Figure 1:
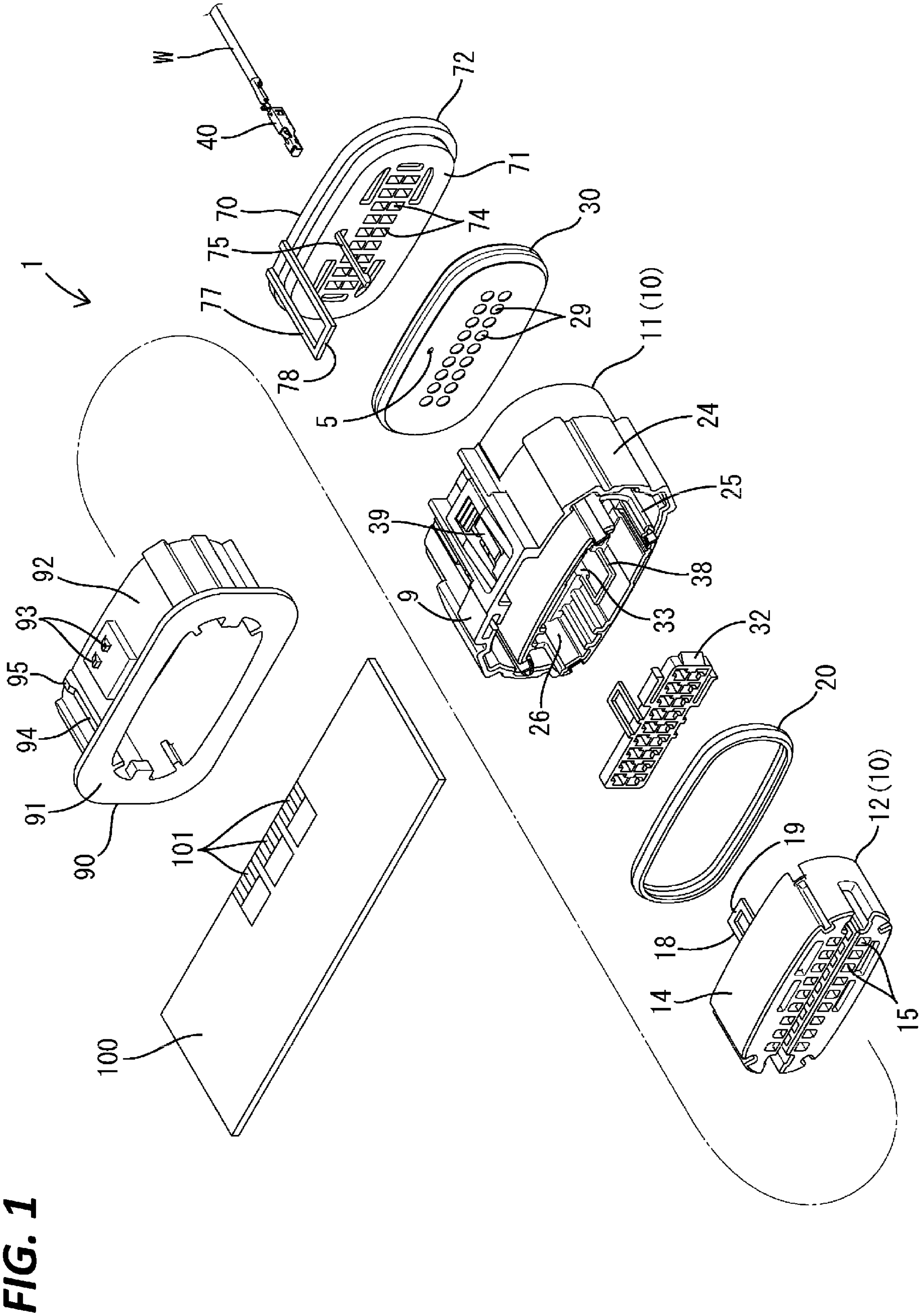
FIG. 1 is an exploded perspective view of a connector according to an embodiment.

First, embodiments of the present disclosure are listed and described.

(1) The connector of the present disclosure is provided with a connecting member including a contact point portion, a housing for holding the connecting member, and a protecting member displaceable with respect to the connecting member to a protection position for protecting the contact point portion and a connection position for bringing the contact point portion into contact with a circuit board, the housing including a lock portion for holding the protecting member at the protection position. According to this configuration, when the protecting member is at the protection position, the contact point portion of the connecting member is protected by the protecting member and the interference of external matters with the contact point portion can be avoided. Thus, when the protecting member is at the connection position, a state where the contact point portion of the connecting member is in contact with the circuit board can be satisfactorily realized. Particularly, since the protecting member is held at the protection position by the lock portion, the protecting member can be prevented from inadvertently moving from the protection position.

(2) Preferably, a mating housing is provided which is connectable to the housing, and the mating housing includes a lock releasing portion for releasing a holding state by the lock portion. According to this configuration, the holding state by the lock portion can be released as the housing is connected to the mating housing, and a special step of releasing the holding state can be omitted.

(3) The housing may include a first housing for holding the connecting member and a second housing for holding the protecting member, and the lock portion may be provided on the first housing and the second housing may be provided with a locked portion to be locked by the lock portion. According to this configuration, the protecting member needs not be provided with the locked portion and the complication of the structure of the protecting member can be avoided.

(4) A releasing member may be provided which is displaceable to a partial locking position and a full locking position with respect to the first housing, the releasing member may include a displacement restricting portion for restricting a displacement to the full locking position at the partial locking position and a following movement releasing portion for releasing a locked state of the lock portion and the locked portion at the full locking position, and the lock releasing portion may release a displacement restricted state by the displacement restricting portion. According to this configuration, when the housing and the mating housing are connected, the displacement restricted state by the displacement restricting portion is released by the lock releasing portion and the releasing member becomes displaceable from the partial locking position to the full locking position. When the releasing member reaches the full locking position, the following movement releasing portion releases the locked state of the lock portion and the locked portion and the protecting member becomes displaceable from the protection position to the connection position. Since the lock releasing portion does not directly release the locked state of the lock portion and the locked portion, the complication of the structure of the mating housing can be avoided.

[Details of Embodiment of Present Disclosure]

A specific example of a connector of the present disclosure is described below with reference to the drawings. Note that the present invention is not limited to this illustration and is intended to be represented by claims and include all changes in the scope of claims and in the meaning and scope of equivalents.

<Basic Structure>

Figure 3:
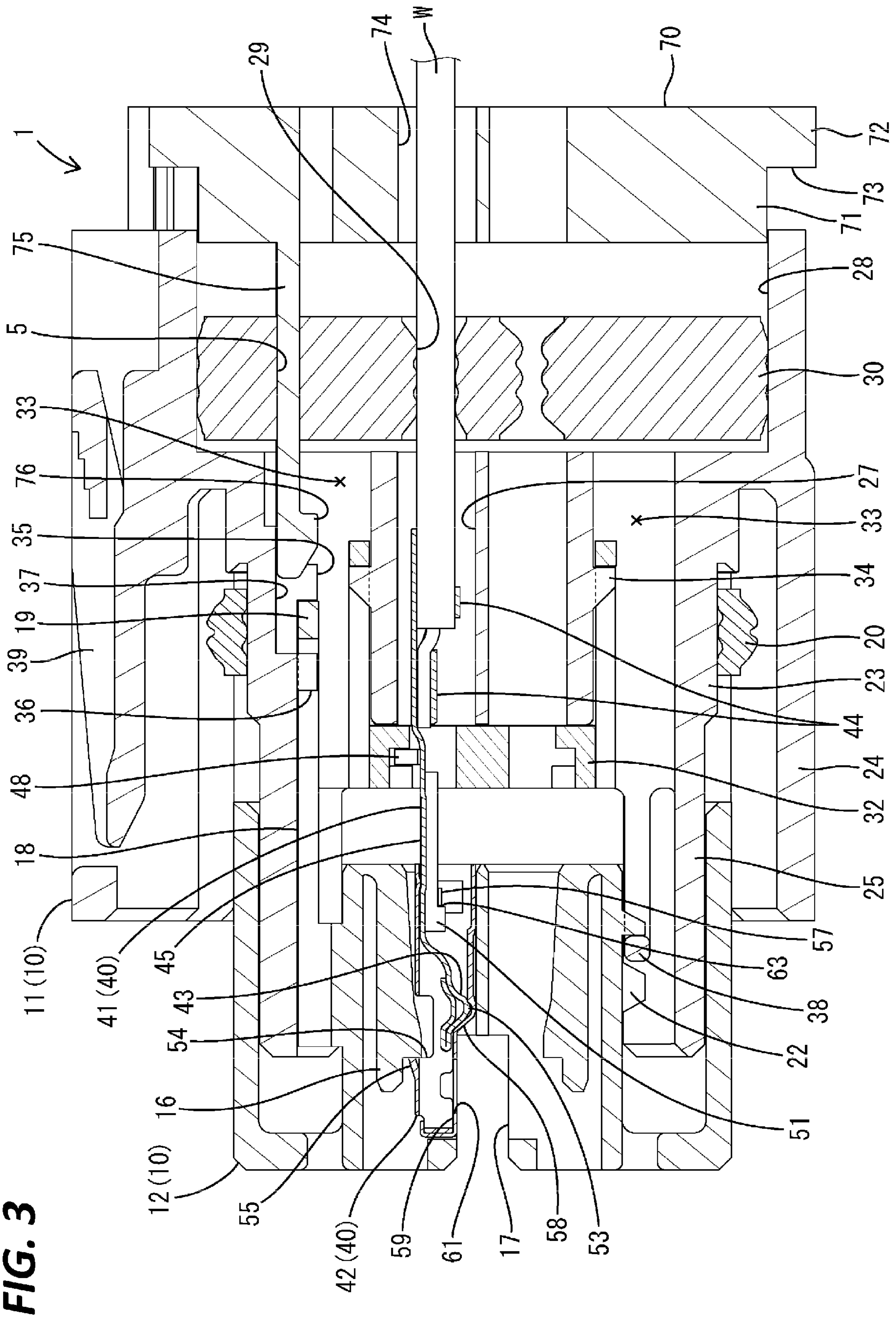
FIG. 3 is a side view in section showing a state where a rear holder is at a partial locking position, a second housing is at an initial position and a protecting member is at a protection position.

A connector 1 of the present disclosure includes, as shown in FIG. 1, a housing 10 and a mating housing 90 connectable to each other, terminal fittings 40 to be accommodated into the housing 10 and a rear holder 70 to be assembled with the housing 10. The housing 10, the mating housing 90 and the rear holder 70 are made of synthetic resin. The housing 10 includes a first housing 11 and a second housing 12. The terminal fitting 40 is a plate member made of conductive metal. As shown in FIG. 3, the terminal fitting 40 includes a connecting member 41 and a protecting member 42. The connecting member 41 is held in the first housing 11. The protecting member 42 is held in the second housing 12. The mating housing 90 is fixed to an unillustrated case. A circuit board 100 is installed in the case. A later-described contact point portion 53 of the connecting member 41 is electrically connected to the circuit board 100.

The protecting member 42 is relatively displaceable with respect to the connecting member 41 to a protection position for protecting the contact point portion 53 and a connection position for connecting the contact point portion 53 to the circuit board 100. When the housing 10 is connected to the mating housing 90, the first and second housings 11, 12 are displaced relative to each other via the rear holder 70 and the connecting member 41 can reach the connection position from the protection position. The rear holder 70 is configured as a releasing member for allowing relative displacements of the first and second housings 11, 12. Note that, in the following description, surface sides facing each other when the connection of the housing 10 and the mating housing 90 is started are referred to as front sides concerning a front-rear direction.

<Mating Housing>

Figure 9:
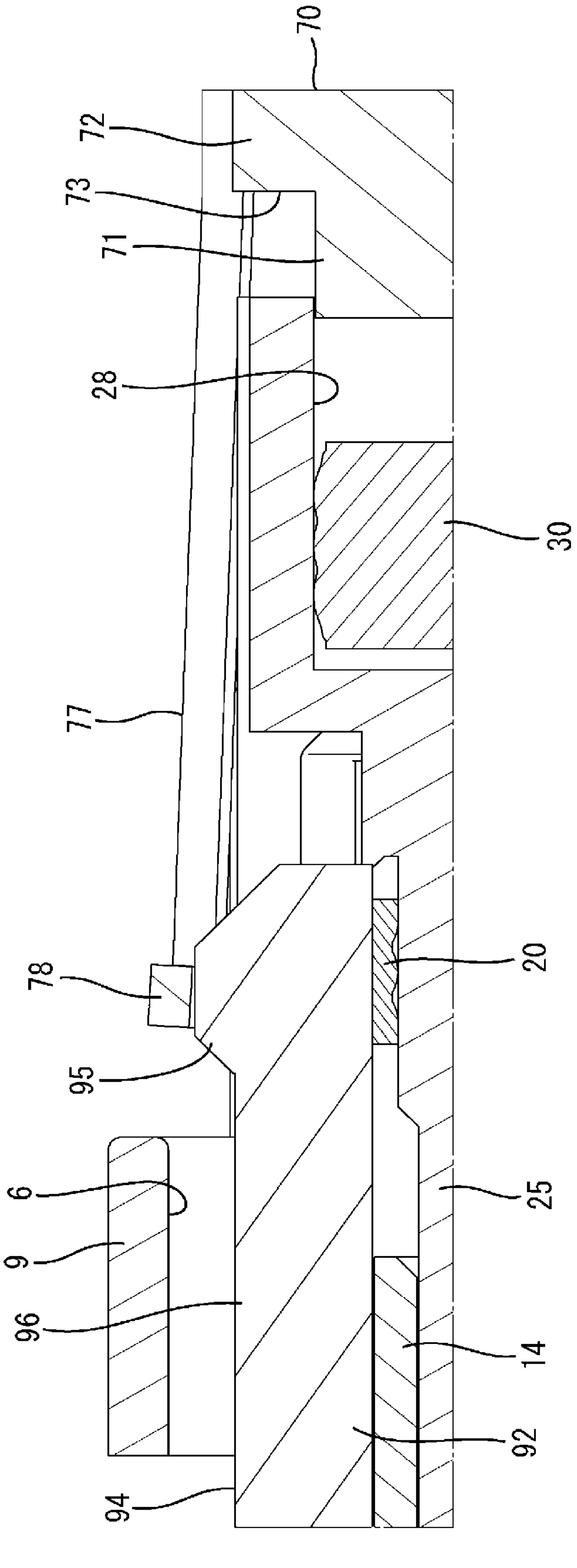
FIG. 9 is a partial enlarged view showing a state where a lock releasing portion deflects and deforms the displacement restricting portion.

As shown in FIG. 1, the mating housing 90 includes a flange portion 91 to be connected to the unillustrated case and a tubular receptacle 92 projecting forward from the flange portion 91. The mating housing 90 has a flat shape extending in the width direction as a whole. The receptacle 92 includes mating housing lock portions 93 and a lock releasing portion 94 on the upper surface of an upper wall. The mating housing lock portions 93 paired in the width direction project in a widthwise central part of the upper surface of the upper wall. The lock releasing portion 94 is in the form of a rib extending in the front-rear direction on one widthwise side of the upper surface of the upper wall. A lock releasing body 95 is provided to project higher on a front end part of the lock releasing portion 94. As shown in FIG. 9, the front surface of the lock releasing body 95 is obliquely arranged and located on a front end side (opening end side) of the receptacle 92. The rear surface of the lock releasing body 95 is obliquely arranged and continuous with a rib-like ridge portion 96 of the lock releasing portion 94.

<Housing>

The housing 10 is configured by assembling the second housing 12 in a front part of the first housing 11. The housing 10 has a flat shape long in the width direction as a whole.

Figure 4:
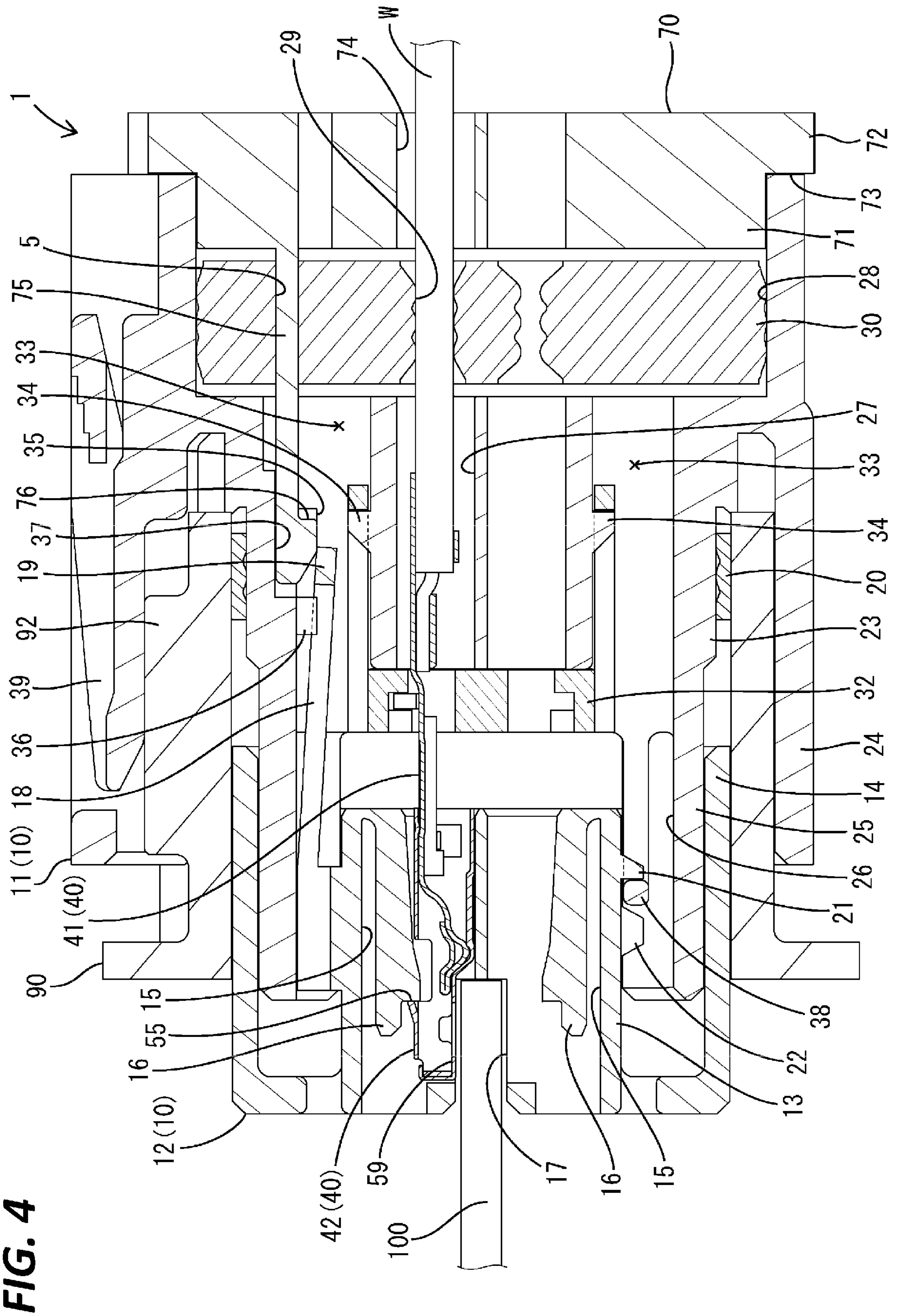
FIG. 4 is a section showing a state where a following movement releasing portion deflects and deforms a locked portion while the rear holder is moving toward a full locking position from the state of FIG. 3.

As shown in FIG. 4, the second housing 12 includes a second housing body 13 and a tubular portion 14 surrounding the outer periphery of the second housing body 13. The second housing body 13 includes a plurality of front cavities 15. A plurality of the front cavities 15 are arranged side by side in the width direction in each of two stages in the vertical direction.

The second housing body 13 includes a plurality of locking lances 16. Each locking lance 16 extends forward from an inner side surface (upper surface of the front cavity 15 in the upper stage, lower surface of the front cavity 15 in the lower stage) of the front cavity 15 and includes a part projecting into the front cavity 15. The protecting member 42 is inserted into the front cavity 15. The protecting member 42 is resiliently locked by the locking lance 16 and held in the second housing 12.

Figure 2:
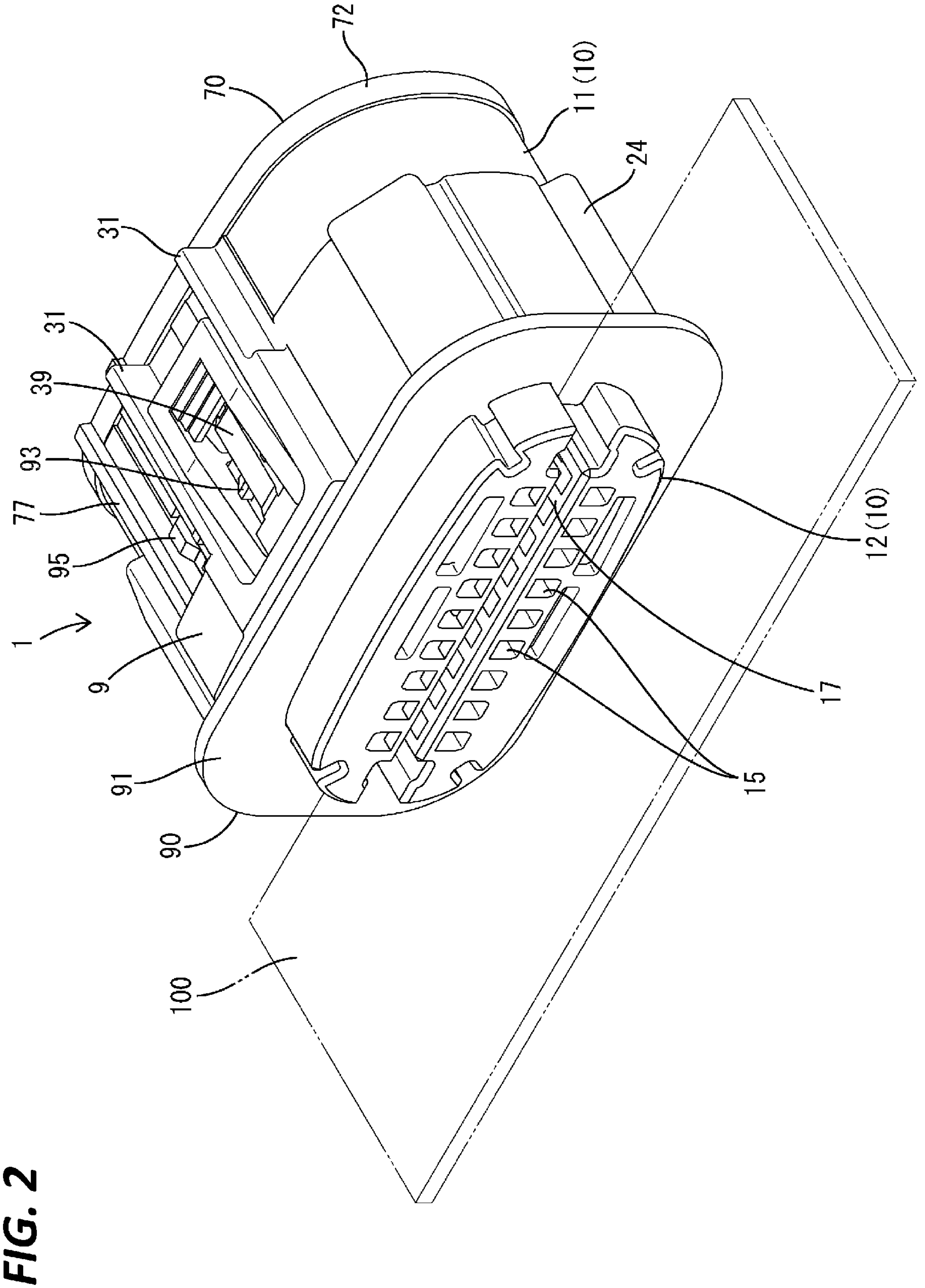
FIG. 2 is a perspective view of the connector.

The second housing 12 includes a board insertion portion 17 in a vertically central part between the upper and lower front cavities 15. As shown in FIG. 2, the board insertion portion 17 is in the form of a slit groove along the width direction and open in the front surface and both side surfaces of the second housing 12. The board insertion portion 17 communicates with each of the upper and lower front cavities 15 in the second housing 12.

As shown in FIGS. 1 and 3, the second housing 12 includes a locked portion 18 projecting rearward. The locked portion 18 projects in a widthwise central part of the upper surface of the second housing body 13 and is shaped to extending rearward. The locked portion 18 is in the form of a gate-shaped frame. The locked portion 18 includes a locked body 19 extending in the width direction in a rear end part. The front and rear surfaces of the locked body 19 are arranged along the vertical direction.

Figure 7:
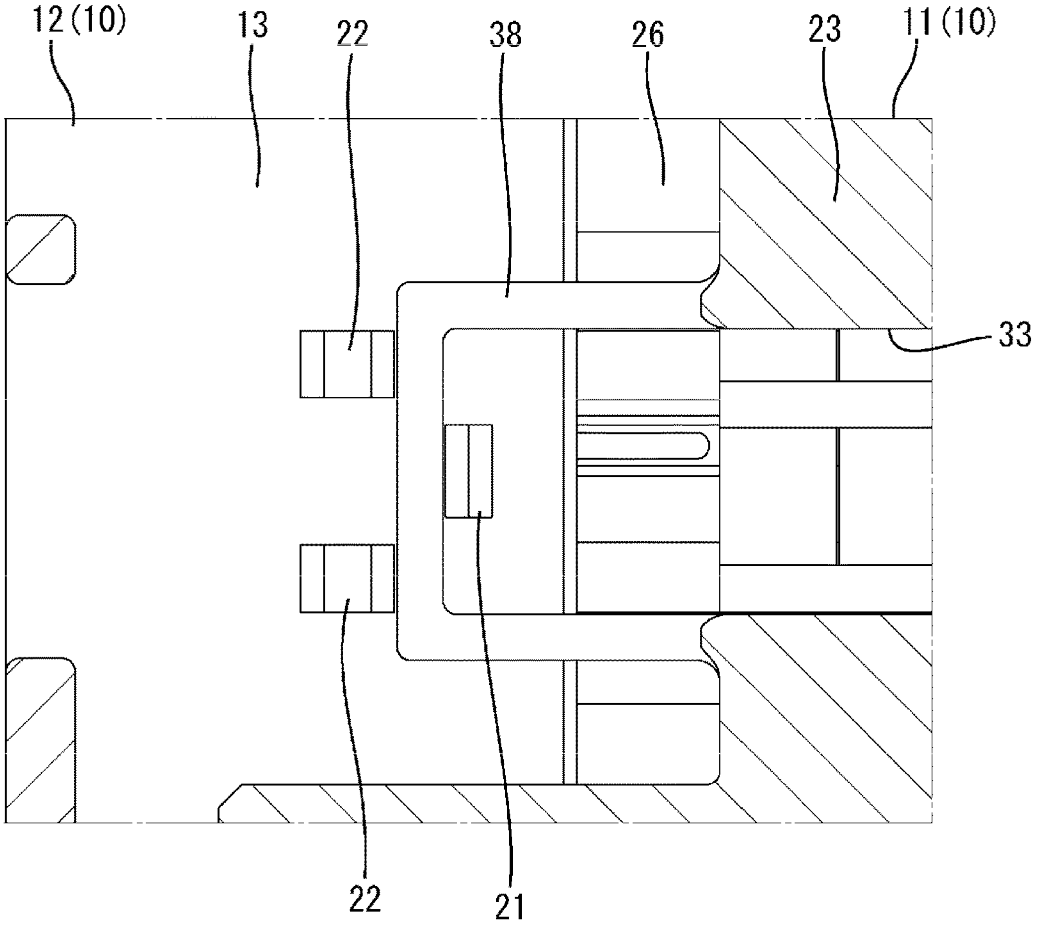
FIG. 7 is a partial enlarged view showing a state where an auxiliary lock piece is arranged between an auxiliary stopper portion and each auxiliary restricting portion.

As shown in FIG. 7, the second housing 12 includes a projection-like auxiliary stopper portion 21 in a widthwise central part of the lower surface of the second housing body 13. The front surface of the auxiliary stopper portion 21 is arranged along the vertical direction. The rear surface of the auxiliary stopper portion 21 is obliquely arranged. Further, the second housing 12 includes auxiliary restricting portions 22 paired in the width direction in front of the auxiliary stopper portion 21 on the lower surface of the second housing body 13. The front and rear surfaces of each auxiliary restricting portion 22 are obliquely arranged. As shown in FIG. 4, a front part of the locked portion 18, the auxiliary stopper portion 21 and each auxiliary restricting portion 22 are arranged between the second housing body 13 and the tubular portion 14.

As shown in FIG. 4, the first housing 11 includes a first housing body 23, a fitting tube portion 24 surrounding the outer periphery of the first housing body 23 and an inner tube portion 25 projecting forward from the first housing body 23. A sealing ring 20 is mounted on the outer periphery of the first housing body 23. The receptacle 92 of the mating housing 90 is fit between the first housing body 23 and the fitting tube portion 24. The sealing ring 20 is sandwiched between the receptacle 92 and the first housing body 23 to seal between the housing 10 and the mating housing 90 in a liquid-tight manner.

The first housing 11 includes a second housing insertion portion 26 in front of the first housing body 23 and inside the inner tube portion 25. The second housing body 13 is inserted into the second housing insertion portion 26. The second housing 12 is displaceable with respect to the first housing 11 to an initial position where the second housing 12 is lightly inserted in the second housing insertion portion 26 (see FIGS. 3 and 4) and a fitting position which is relatively receded from the initial position and where the second housing 12 is deeply fit in the second housing insertion portion 26 (see FIG. 5). A forward projecting amount of the second housing 12 from the first housing 11 decreases as the second housing 12 moves from the initial position to the fitting position.

The first housing body 23 includes a plurality of rear cavities 27 at positions communicating with the respective front cavities 15 via the second housing insertion portion 26. A rear part of the connecting member 41 is inserted into each rear cavity 27.

A one-piece rubber plug 30 is mounted in a rear part of the first housing body 23. The one-piece rubber plug 30 is made of rubber such as silicon rubber and accommodated into an accommodating portion 28 open in the rear surface of the first housing body 23. The one-piece rubber plug 30 includes a plurality of sealing holes 29 at positions communicating with the respective rear cavities 27. A wire W connected to the connecting member 41 is inserted into each sealing hole 29 of the one-piece rubber plug 30 in a liquid-tight manner.

A rear holder 70 is accommodated into the accommodating portion 28 of the first housing body 23, following the one-piece rubber plug 30. The rear holder 70 is held in the first housing body 23. The one-piece rubber plug 30 is restricted from coming out from the accommodating portion 28 by the rear holder 70. Note that the structure of the rear holder 70 is described in detail later.

A retainer 32 is mounted in the first housing 11. The retainer 32 is movable in the width direction along the front surface of the first housing body 23. The retainer 32 locks the connecting members 41. The connecting members 41 are held in the first housing 11 by the retainer 32.

As shown in FIG. 4, the first housing 11 includes a pair of upper and lower space portions 33. The respective space portions 33 are arranged in upper and lower end parts across the respective rear cavities 27 in a widthwise central part of the first housing body 23. Each space portion 33 penetrates in the front-rear direction in the first housing body 23 and communicates with the second housing insertion portion 26 and the accommodating portion 28.

The first housing body 23 includes projection-like retainer holding portions 34 on the inner side surfaces (wall surfaces near a vertical center of the first housing body 23) of the respective space portions 33. The retainer 32 is restricted from being separated forward from the first housing body 23 by the retainer holding portions 34.

Figure 6:
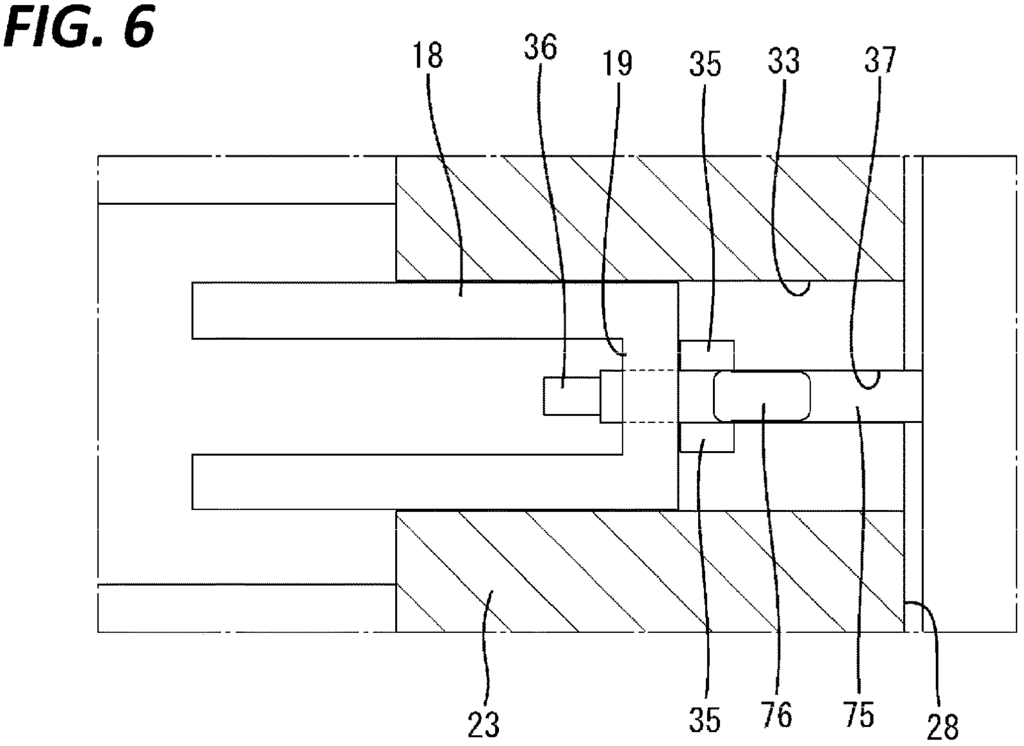
FIG. 6 is a partial enlarged view showing a state where a locked body of the locked portion is arranged between each lock portion and a separation restricting portion.

Further, the first housing body 23 includes projection-like lock portions 35 on the outer side surface (wall surface away from the vertical center of the first housing body 23) of the upper space portion 33. As shown in FIG. 6, the lock portions 35 paired in the width direction are provided on the outer side surface of the upper space portion 33.

The first housing body 23 includes a projection-like separation restricting portion 36 at a position forward of the lock portions 35 on the outer side surface of the upper space portion 33. The separation restricting portion 36 is located between the lock portions 35 paired in the width direction. The front and rear surfaces of each lock portion 35 are arranged along the vertical direction. The front and rear surfaces of the separation restricting portion 36 are also arranged along the vertical direction. The locked body 19 of the locked portion 18 of the second housing 12 is lockable to each lock portion 35 and the separation restricting portion 36.

Further, as shown in FIG. 6, the first housing body 23 includes a following movement guiding groove 37 at a position behind the separation restricting portion 36 and between the pair of lock portions 35 on the outer side surface of the upper space portion 33. The following movement guiding groove 37 is recessed on the outer side surface of the upper space portion 33 and communicates with the accommodating portion 28. A later-described following movement releasing portion 75 of the rear holder 70 is insertable into the following movement guiding groove 37.

As shown in FIGS. 1 and 7, the first housing body 23 includes an auxiliary lock piece 38 projecting forward while striding over the lower space portion 33. The auxiliary lock piece 38 is in the form of a gate-shaped frame and lockable to the auxiliary stopper portion 21 and each auxiliary restricting portion 22 of the second housing 12.

As shown in FIG. 2, the first housing 11 includes a deflectable and deformable lock arm 39 in a widthwise central part of the upper wall of the fitting tube portion 24. The lock arm 39 locks the mating housing lock portions 93 and holds the housing 10 and the mating housing 90 in a fit state.

A pair of protection walls 31 project on both widthwise sides across the lock arm 39 on the upper wall of the fitting tube portion 24. As shown in FIG. 1, a gate-shaped insertion portion 9 projects on one widthwise side of the upper wall of the fitting tube portion 24. The insertion portion 9 is coupled to a front part of the protection wall 31 arranged on the one widthwise side.

Figure 8:
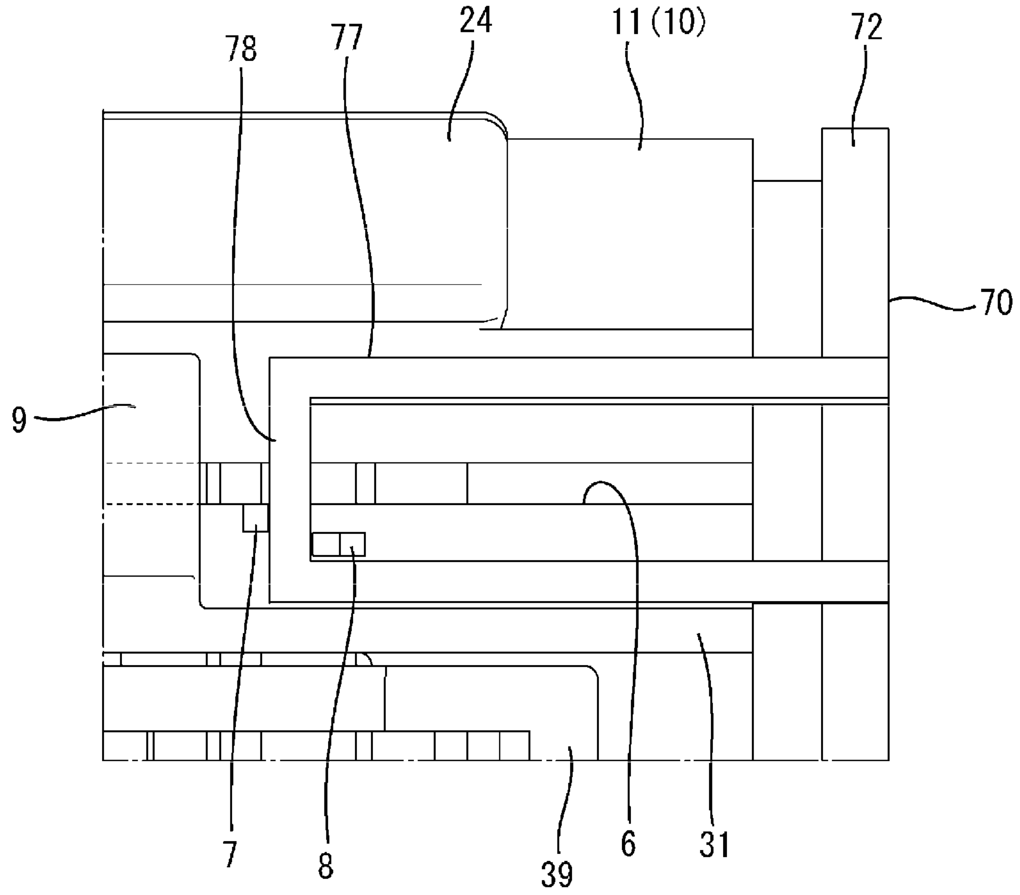
FIG. 8 is a partial enlarged view showing a state where a restricting body of a displacement restricting portion is arranged between a partial locking portion and a full locking portion.

As shown in FIG. 8, the first housing 11 includes a partial locking portion 8 and a full locking portion 7 on the one widthwise side of the upper wall of the fitting tube portion 24. The partial locking portion 8 and the full locking portion 7 are both in the form of a projection. The partial locking portion 8 is arranged behind the full locking portion 7 and closer to a widthwise center of the first housing 11 than the full locking portion 7. The partial locking portion 8 and the full locking portion 7 are arranged laterally to the protection wall 31 and behind the insertion portion 9.

The front surface of the partial locking portion 8 is obliquely arranged. The rear surface of the partial locking portion 8 is arranged along the vertical direction. The front and rear surfaces of the full locking portion 7 are arranged along the vertical direction.

The first housing 11 includes a release guiding groove 6 extending in the front-rear direction and open on the front end of the fitting tube portion 24 on the one widthwise side of the upper wall of the fitting tube portion 24. The release guiding groove 6 is provided to penetrate through the upper wall of the fitting tube portion 24 in the vertical direction (wall thickness direction). The release guiding groove 6 is arranged adjacent to one widthwise side of the full locking portion 7. A front part of the release guiding groove 6 is arranged to communicate with the inside of the insertion portion 9. As shown in FIG. 9, the lock releasing portion 94 of the mating housing 90 is insertable into the release guiding groove 6 through the insertion portion 9.

<Rear Holder>

The rear holder 70 is made of synthetic resin and, as shown in FIG. 4, a front section 71 is sized to be fittable into the accommodating portion 28. A rear section 72 of the rear holder 70 is one size larger than the front section 71 and a step 73 is formed between the front section 71 and the rear section 72. The rear holder 70 includes a plurality of insertion holes 74 at positions communicating with the respective sealing holes 29. The wire W is inserted with play into each insertion hole 74 of the rear holder 70.

As shown in FIGS. 1 and 4, the rear holder 70 includes the elongated following movement releasing portion 75 projecting forward. The following movement releasing portion 75 projects in a widthwise central part of an upper end part of the front surface of the front section 71. The following movement releasing portion 75 has a rectangular horizontal cross-sectional shape. A claw-like pressing portion 76 is provided to project downward on a front end part of the following movement releasing portion 75. The front surface of the pressing portion 76 is obliquely arranged. The rear surface of the pressing portion 76 is arranged along the vertical direction.

As shown in FIG. 1, the rear holder 70 includes a displacement restricting portion 77 projecting forward above the following movement releasing portion 75. The displacement restricting portion 77 projects on one widthwise side of the upper end of the rear section 72 and is shaped to extend further forward. The displacement restricting portion 77 is in the form of a gate-shaped frame. The displacement restricting portion 77 includes a restricting body 78 extending in the width direction in a front end part. As shown in FIG. 9, the front and rear surfaces of the restricting body 78 are arranged along the vertical direction. Note that the restricting body 78 is somewhat curved in the width direction along the outer peripheral shape of the rear section 72.

The rear holder 70 is relatively displaceable to a partial locking position (see FIG. 3) and a full locking position (see FIGS. 4 and 5) with respect to the first housing 11. When the rear holder 70 is at the partial locking position, the restricting body 78 is arranged between the full locking portion 7 and the partial locking portion 8 as shown in FIG. 8. When the rear holder 70 is at the full locking position, the restricting body 78 is separated from the partial locking portion 8 and arranged to face the front surface of the full locking portion 7.

<Terminal Fittings>

As shown in FIG. 3, the terminal fitting 40 is configured by arranging the protecting member 42 on a front part of the connecting member 41. The protecting member 42 is relatively displaceable to the protection position (see FIGS. 3 and 4) and the connection position (see FIG. 5) with respect to the connecting member 41.

The connecting member 41 is formed into a shape elongated in the front-rear direction by bending one metal plate. The connecting member 41 includes a resilient contact portion 43 in a front part, a wire connecting portion 44 in a rear part and a base portion 45 between the resilient contact portion 43 and the wire connecting portion 44. The wire connecting portion 44 is crimped and connected to a conductor part (core) and an insulation coating of the wire W.

The base portion 45 is in the form of a strip extending in the front-rear direction and having plate surfaces extending along the width direction.

The connecting member 41 includes a pair of projecting pieces 48 projecting upward from both widthwise ends of a rear end part of the base portion 45. The respective projecting pieces 48 function as stabilizers for guiding an inserting operation of the terminal fitting 40 into the housing 10.

The retainer 32 is lockable to each projecting piece 48. By the abutment of the retainer 32 on the front ends of the projecting pieces 48, the protecting member 42 is restricted from being displaced to the connection position with respect to the connecting member 41. Further, the retainer 32 is displaced in the width direction and abuts on the rear ends of the projecting pieces 48, whereby the protecting member 42 is restricted from being separated from the connecting member 41.

The connecting member 41 includes a pair of side portions 51 (only one side portion 51 is shown in FIG. 3) projecting downward from both widthwise ends of the base portion 45 in front of the both projecting pieces 48. The both side portions 51 are shaped to have plate surfaces extending along the vertical direction and extend in the front-rear direction. An intermediate part in the front-rear direction of the connecting member 41 has a gate-shaped cross-section by having the base portion 45 and the both side portions 51. A step portion 63 is provided on a front lower end of the side portion 51.

The protecting member 42 is in the form of a box, particularly a rectangular tube, as a whole and includes a front wall, an upper wall, a lower wall and a pair of side walls. A front part of the connecting member 41 is arranged inside the protecting member 42.

A lance hole 54 rectangular in a plan view is provided to be open in the upper wall of the protecting member 42 as shown in FIG. 3. Further, the upper wall of the protecting member 42 is provided with a locking projection 55 bent upward on the front edge of the lance hole 54. A front end part of the locking lance 16 enters the lance hole 54. The locking projection 55 is locked by a front end part of the locking lance 16.

The protecting member 42 includes holding portions 57 in rear parts of the side walls. The holding portions 57 are arranged to sandwich the intermediate part in the front-rear direction of the connecting member 41 between the facing upper wall and the holding portions 57. The intermediate part in the front-rear direction of the connecting member 41 is held between the holding portions 57 and the upper wall while being allowed to move.

Figure 5:
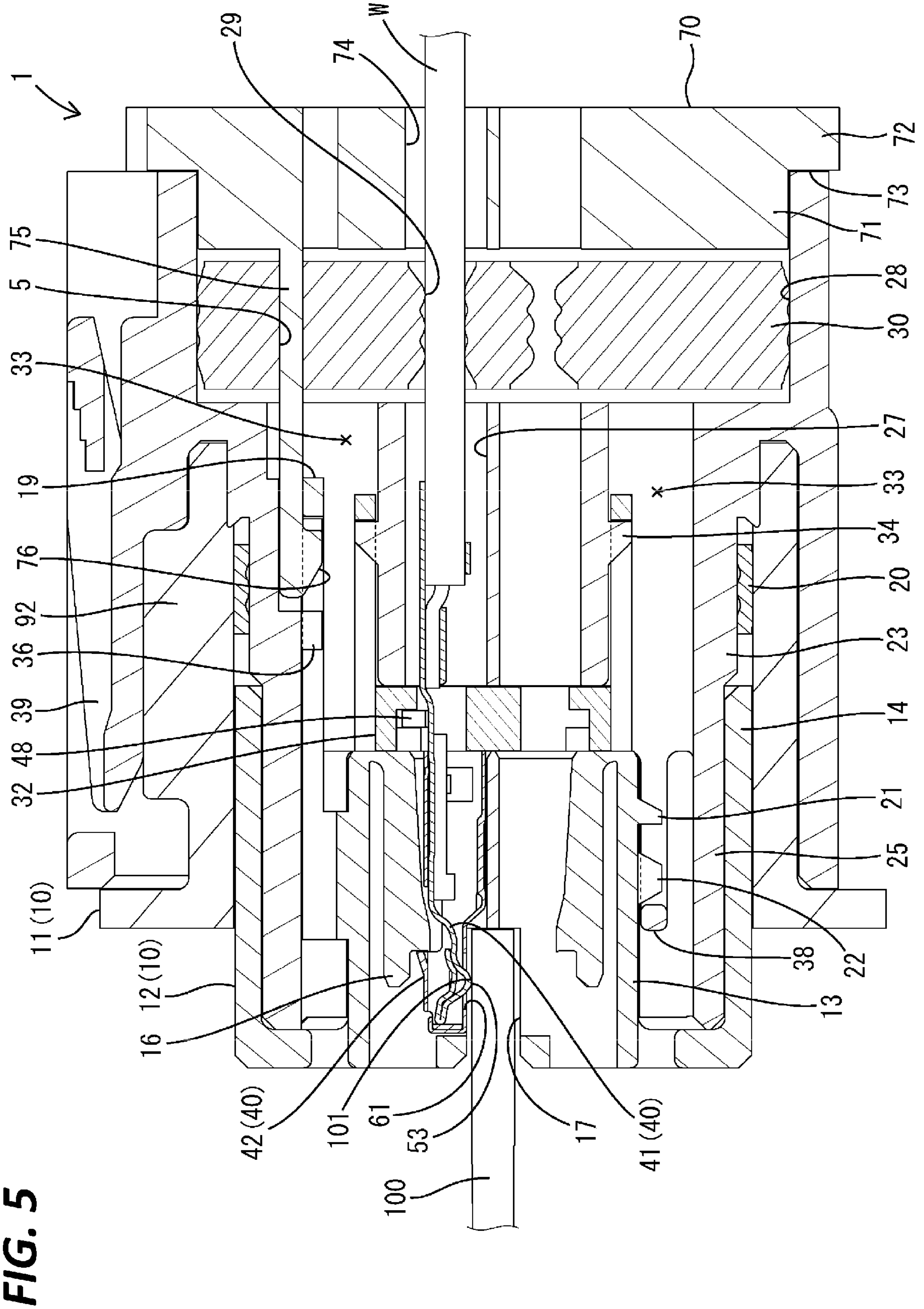
FIG. 5 is a section showing a state where the rear holder reaches the full locking position from the state of FIG. 4, the second housing reaches a fitting position and the protecting member reaches a connection position.

The protecting member 42 includes a slope portion 58 inclined upward to the front at an intermediate position in the front-rear direction of the lower wall. A front part of the lower wall in the protecting member 42 serves as an upper stage portion 59 arranged higher than a rear part of the lower wall via the slope portion 58. The upper stage portion 59 is provided with a connection hole 61 open in front of the slope portion 58. The circuit board 100 is arranged along the upper stage portion 59. As shown in FIG. 5, the contact point portion 53 of the resilient contact portion 43 contacts a conductive portion 101 of the circuit board 100 through the connection hole 61 at the connection position.

<Assembling Structure of Connector>

Prior to the insertion of the terminal fitting 40 into the housing 10, the protecting member 42 is held at the protection position with respect to the connecting member 41. When the protecting member 42 is at the protection position, the contact point portion 53 abuts on the slope portion 58, thereby restricting a forward displacement of the connecting member 41 with respect to the protecting member 42 (see FIG. 3). Further, when the protecting member 42 is at the protection position, the step portions 63 of the side portions 51 abut on the holding portions 57, thereby restricting a rearward displacement of the connecting member 41 with respect to the protecting member 42. When the protecting member 42 is at the protection position, the contact point portion 53 of the resilient contact portion 43 is arranged to be protected inside the protecting member 42 behind the slope portion 58. Thus, the interference of external matters with the contact point portion 53 can be avoided.

Prior to the insertion of the terminal fitting 40 into the housing 10, the second housing 12 is kept at the initial position with respect to the first housing 11. After the locked portion 18 is deflected and deformed, the second housing 12 reaches the initial position and the locked body 19 is fit between each lock portion 35 and the separation restricting portion 36 (see FIGS. 3 and 6). Further, when the second housing 12 reaches the initial position, a front end part of the auxiliary lock piece 38 is fit between each auxiliary restricting portion 22 and the auxiliary stopper portion 21 (see FIG. 7).

By the abutment of the locked body 19 on the front surface of each lock portion 35 and, further, by the abutment of the front end part of the auxiliary lock piece 38 on the rear surface of each auxiliary restricting portion 22, the second housing 12 is restricted from being displaced to the fitting position with respect to the first housing 11. By the abutment of the locked body 19 on the rear surface of the separation restricting portion 36 and, further, by the abutment of the front end part of the auxiliary lock piece 38 on the front surface of each auxiliary stopper portion 21, the second housing 12 is restricted from being separated from the initial position with respect to the first housing 11. The second housing body 13 is arranged in front of and away from the front surface of the retainer 32 at the initial position (see FIG. 3).

Prior to the insertion of the terminal fitting 40 into the housing 10, the rear holder 70 is kept at the partial locking position with respect to the first housing 11. When the rear holder 70 reaches the partial locking position, the restricting body 78 of the displacement restricting portion 77 is fit between the partial locking portion 8 and the full locking portion 7 (see FIG. 8). By the abutment of the restricting body 78 on the rear surface of the full locking portion 7, the rear holder 70 is restricted from being displaced to the full locking position with respect to the first housing 11. By the abutment of the restricting body 78 on the front surface of the partial locking portion 8, the rear holder 70 is restricted from being separated from the partial locking position with respect to the first housing 11. The front section 71 of the rear holder 70 is arranged to be only partially inserted in the accommodating portion 28 at the partial locking position (see FIG. 3). The rear section 72 of the rear holder 70 is arranged to be exposed behind the first housing 11 at the partial locking position.

A rear part of the following movement releasing portion 75 is passed through a through hole 5 provided in the one-piece rubber plug 30. A front part of the following movement releasing portion 75 is inserted into the space portion 33 of the first housing 11 and enters the following movement guiding groove 37 and is guided. The pressing portion 76 of the following movement releasing portion 75 is arranged at a position between the respective lock portions 35 behind the separation restricting portion 36 (see FIG. 6).

With the protecting member 42 located at the protection position, the terminal fittings 40 are inserted into the housing 10 from behind. The terminal fittings 40 in the upper and lower stages are inserted in mutually vertically opposite postures into the housing 10 (terminal fittings 40 in the lower stage are not shown). The terminal fitting 40 in the upper stage is arranged with each projecting piece 48 facing upward and the terminal fitting 40 in the lower stage is arranged with each projecting piece 48 facing downward.

The protecting member 42 is inserted into the front cavity 15 through the insertion hole 74, the sealing hole 29 and the rear cavity 27. When the terminal fitting 40 is properly inserted into the housing 10, the locking projection 55 is locked by the locking lance 16 and the protecting member 42 is retained and held in the second housing 12 (see FIG. 3). The connection hole 61 of the protecting member 42 is arranged to communicate with the board insertion portion 17. Further, a rear part of the connecting member 41 on the side of the wire connecting portion 44 is arranged in the rear cavity 27 and a front part thereof on the side of the resilient contact portion 43 is arranged in the front cavity 15 together with the protecting member 42. The wire W is inserted into the sealing hole 29 in a liquid-tight manner and pulled out to outside through the insertion hole 74.

The protecting member 42 is restricted from being relatively displaced from the protection position to the connection position by the projecting pieces 48 of the connecting member 41 abutting on the retainer 32.

As described above, when the second housing 12 is at the initial position with respect to the first housing 11, the second housing 12 is restricted from being displaced toward the fitting position by the locking of each lock portion 35. The protecting member 42 is held in the second housing 12 and the connecting member 41 is held in the first housing 11. Thus, the protecting member 42 is held at the protection position with respect to the connecting member 41 by the locking of each lock portion 35.

Subsequently, the housing 10 is connected to the mating housing 90. In this way, one end part of the circuit board 100 is inserted into the board insertion portion 17. Plate surfaces of the circuit board 100 are arranged along the width direction. In the process of connecting the housing 10 and the mating housing 90, the rear section 72 of the rear holder 70 is pressed toward the mating housing 90.

In the process of connecting the housing 10 and the mating housing 90, the lock releasing portion 94 enters the release guiding groove 6 and is guided. The lock releasing body 95 passes through the insertion portion 9, abuts on the restricting body 78 and deflects and deforms the displacement restricting portion 77 upward (see FIG. 9). In this way, the restricting body 78 is separated from the front surface of the partial locking portion 8 and the rear surface of the full locking portion 7 and a displacement restricted state of the rear holder 70 with respect to the first housing 11 is released. In the process of connecting the housing 10 and the mating housing 90, the rear holder 70 is maintained in a state pressed toward the mating housing 90. Thus, the rear holder 70 is displaced toward the full locking position with respect to the first housing 11 as the displacement restricted state is released.

Figure 10:
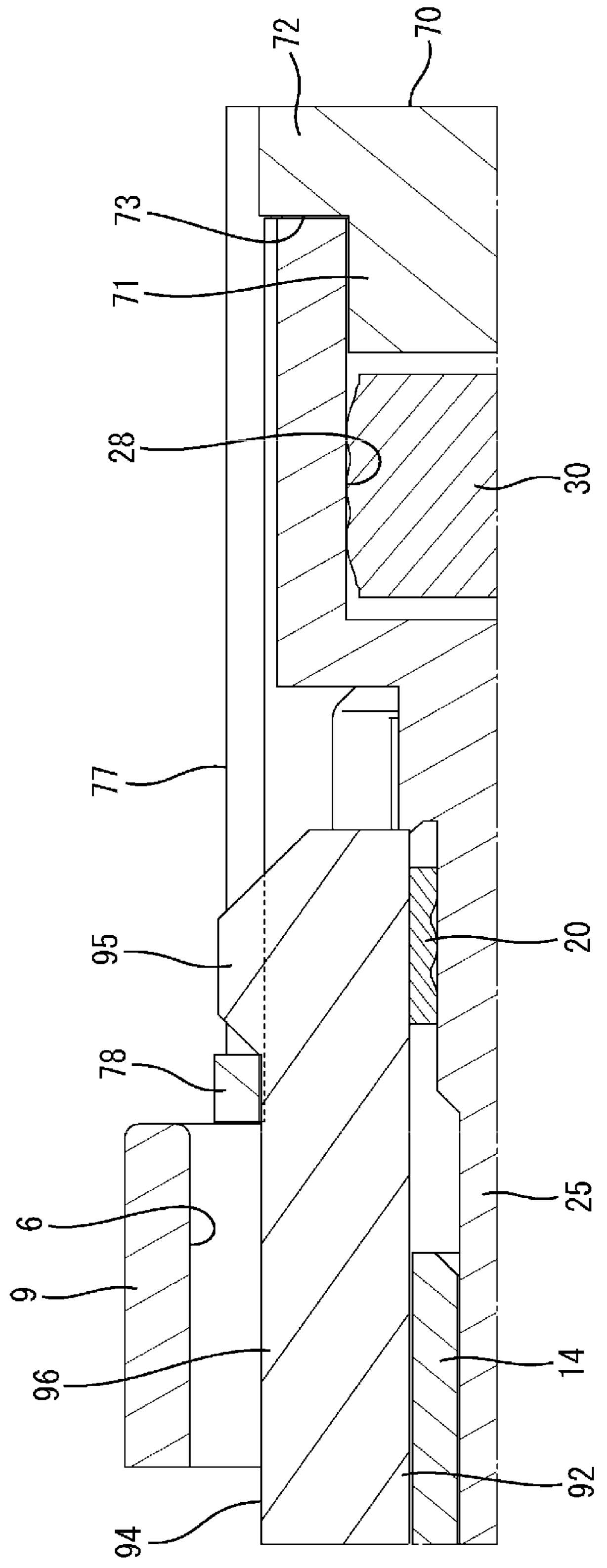
FIG. 10 is a partial enlarged view showing a state where the displacement restricting portion is resiliently restored from the state of FIG. 9.

When the rear holder 70 reaches the full locking position, the displacement restricting portion 77 is resiliently restored and the restricting body 78 is arranged to face the front surface of the full locking portion 7 while abutting on the ridge portion 96 (see FIG. 10). The step 73 of the rear holder 70 is arranged to abut on the rear end of the first housing 11 at the full locking position. In this way, the rear holder 70 is held at the full locking position with respect to the housing 10.

Further, when the rear holder 70 reaches the full locking position, the pressing portion 76 of the following movement releasing portion 75 abuts on the locked body 19 and deflects and deforms the locked portion 18 downwardly of the space portion 33 (see FIG. 4). Then, the locked body 19 is separated from the front surface of each lock portion 35 and the second housing 12 becomes displaceable to the fitting position with respect to the first housing 11.

As just described, by a displacement of the rear holder 70 to the full locking position, the second housing 12 can also be displaced toward the fitting position with respect to the first housing 11. If the second housing 12 is displaced toward the fitting position with respect to the first housing 11, the front end part of the auxiliary lock piece 38 rides on the rear surface of each auxiliary restricting portion 22 and the auxiliary lock piece 38 is deflected and deformed.

When the second housing 12 reaches the fitting position, the locked portion 18 is resiliently restored and the locked body 19 is arranged to face the rear surface of the pressing portion 76 (see FIG. 5). The auxiliary lock piece 38 is also resiliently restored and the front end part of the auxiliary lock piece 38 is arranged to face the front surface of each auxiliary restricting portion 22. In this way, the second housing 12 is held at the fitting position with respect to the first housing 11 via the rear holder 70. Further, the lock arm 39 resiliently locks the mating housing lock portions 93 and the housing 10 and the mating housing 90 are held in the fit state. The second housing body 13 is deeply inserted in the second housing insertion portion 26 and arranged to abut on the front surface of the retainer 32 at the fitting position.

As the second housing 12 is displaced toward the fitting position with respect to the first housing 11, the protecting member 42 is also displaced toward the connection position with respect to the connecting member 41. When viewed from the side of the connecting member 41, the connecting member 41 relatively moves forward with respect to the protecting member 42.

In the process of relatively displacing the connecting member 41 and the protecting member 42, the resilient contact portion 43 is deflected and deformed, the contact point portion 53 slides on the slope portion 58 and the lower end of the contact point portion 53 temporarily rides on the upper stage portion 59.

When the second housing 12 reaches the fitting position with respect to the first housing 11, the protecting member 42 also reaches the connection position with respect to the connecting member 41. At the connection position, the contact point portion 53 falls down from the upper stage portion 59 and contacts the conductive portion 101 of the circuit board 100 through the connection hole 61 (see FIG. 5). The resilient contact portion 43 is maintained in a deflected and deformed state.

As described above, according to this embodiment, when the protecting member 42 is at the protection position, the contact point portion 53 of the connecting member 41 is protected by the protecting member 42 and the interference of external matters with the contact point portion 53 can be avoided. Thus, when the protecting member 42 is at the connection position, a state where the contact point portion 53 is in contact with the circuit board 100 can be satisfactorily realized. Particularly, since the protecting member 42 is held at the protection position by each lock portion 35, the protecting member 42 can be prevented from being inadvertently displaced from the protection position.

Further, according to the connecting operation of the housing 10 and the mating housing 90, the lock releasing portion 94 of the mating housing 90 releases the holding state (state where relative displacements of the first and second housings 11, 12 are restricted and the protecting member 42 is held at the protection position with respect to the connecting member 41) by each lock portion 35. Thus, a special step of releasing the holding state by each lock portion 35 can be omitted.

Furthermore, in the case of this embodiment, each lock portion 35 is provided on the first housing 11, the locked portion 18 to be locked by each lock portion 35 is provided on the second housing 12, and the protecting member 42 is not provided with the locked portion 18. Thus, it can be avoided that the structure of the protecting member 42 becomes complicated due to the formation of the locked portion 18.

Further, in the case of this embodiment, the rear holder 70 serving as a releasing member includes the displacement restricting portion 77 for restricting a displacement to the full locking position at the partial locking position and the following movement releasing portion 75 for releasing the locked state of the lock portions 35 and the locked portion 18 at the full locking position, and the lock releasing portion 94 is configured to release the displacement restricted state by the displacement restricting portion 77. Thus, the displacement restricted state by the displacement restricting portion 77 is released by the lock releasing portion 94, whereby the rear holder 70 becomes displaceable to the full locking position. Further, at the full locking position, the following movement releasing portion 75 releases the locked state of the lock portions 35 and the locked portion 18, the second housing 12 becomes displaceable to the fitting position and the protecting member 42 also becomes displaceable to the connection position. Since the lock releasing portion 94 does not directly release the locked state of the lock portions 35 and the locked portion 18, the lock releasing portion 94 can be simply structured and, consequently, the complication of the structure of the mating housing 90 can be avoided.

OTHER EMBODIMENTS

The embodiment disclosed this time should be considered illustrative in all aspects, rather than restrictive.

Although the releasing member having a function of retaining the one-piece rubber plug is the rear holder in the case of the above embodiment, a dedicated releasing member may be provided instead of the rear holder as another embodiment. Further, if a wire cover is mounted on the housing, the wire cover may be used as the releasing member instead of the rear holder.

Although the lock releasing portion is configured to indirectly release the locking of the lock portions and the locked portion via the rear holder in the case of the above embodiment, the lock releasing portion may be configured to directly release the locking of the lock portions and the locked portion as another embodiment. If the lock releasing portion directly releases the locking of the lock portions and the locked portion, the rear holder may be held at the full locking position without being kept at the partial locking position with respect to the housing.

Although the second housing for holding the protecting member includes the locked portion in the case of the above embodiment, a protecting member may include a locked portion as another embodiment. If the protecting member includes the locked portion, the second housing can be omitted from the housing and the housing can be a single component.

Although the protecting member is configured as a part of the terminal fitting in the case of the above embodiment, a protecting member may be provided separately from a terminal fitting as another embodiment. For example, the protecting member may be made of synthetic resin and constitute a part of a housing.

LIST OF REFERENCE NUMERALS

1 . . . connector
5 . . . through hole
6 . . . release guiding groove
7 . . . full locking portion
8 . . . partial locking portion
9 . . . insertion portion
10 . . . housing
11 . . . first housing
12 . . . second housing
13 . . . second housing body
14 . . . tubular portion
15 . . . front cavity
16 . . . locking lance
17 . . . board insertion portion
18 . . . locked portion
19 . . . locked body
20 . . . sealing ring
21 . . . auxiliary stopper portion
22 . . . auxiliary restricting portion
23 . . . first housing body
24 . . . fitting tube portion
25 . . . inner tube portion
26 . . . second housing insertion portion
27 . . . rear cavity
28 . . . accommodating portion
29 . . . sealing hole
30 . . . one-piece rubber plug
31 . . . protection wall
32 . . . retainer
33 . . . space portion
34 . . . retainer holding portion
35 . . . lock portion
36 . . . separation restricting portion
37 . . . following movement guiding groove
38 . . . auxiliary lock piece
39 . . . lock arm
40 . . . terminal fitting
41 . . . connecting member
42 . . . protecting member
43 . . . resilient contact portion
44 . . . wire connecting portion
45 . . . base portion
48 . . . projecting piece
51 . . . side portion
53 . . . contact point portion
54 . . . lance hole
55 . . . locking projection
57 . . . holding portion
58 . . . slope portion
59 . . . upper stage portion
61 . . . connection hole
63 . . . step portion
70 . . . rear holder
71 . . . front section
72 . . . rear section
73 . . . step
74 . . . insertion hole
75 . . . following movement releasing portion
76 . . . pressing portion
77 . . . displacement restricting portion
78 . . . restricting body
90 . . . mating housing
91 . . . flange portion
92 . . . receptacle
93 . . . mating housing lock portion
94 . . . lock releasing portion
95 . . . lock releasing body
96 . . . ridge portion
100 . . . circuit board
101 . . . conductive portion
W . . . wire

What is claimed is:

1. A connector, comprising:

a connecting member including a contact point portion;

a housing for holding the connecting member; and a protecting member displaceable with respect to the connecting member to a protection position in which the contact point portion is protected by the protecting member and a connection position in which the contact point portion comes into contact with a circuit board through a connection hole of the protecting member, the housing including a lock portion for holding the protecting member at the protection position.

2. The connector of claim 1, comprising a mating housing connectable to the housing, wherein:

the mating housing includes a lock releasing portion for releasing a holding state by the lock portion.

3. The connector of claim 2, wherein:

the housing includes a first housing for holding the connecting member and a second housing for holding the protecting member, and the lock portion is provided on the first housing and the second housing is provided with a locked portion to be locked by the lock portion.

4. The connector of claim 3, comprising a releasing member displaceable to a partial locking position and a full locking position with respect to the first housing, wherein:

the releasing member includes:

a displacement restricting portion for restricting a displacement to the full locking position at the partial locking position; and a following movement releasing portion for releasing a locked state of the lock portion and the locked portion at the full locking position, and the lock releasing portion releases a displacement restricted state by the displacement restricting portion.

* * * * *